Dec. 30, 1930. L. V. CASTO Re. 17,912

MARBLEIZING PROCESS
PROCESS FOR SIMULATING NATURAL PATTERNS
Original Filed Jan. 24, 1927

Inventor
Lloyd V. Casto

By Bates Macklin Golrick & Beare
Attorneys

Reissued Dec. 30, 1930 Re. 17,912

UNITED STATES PATENT OFFICE

LLOYD V. CASTO, OF DETROIT, MICHIGAN, ASSIGNOR TO OXFORD VARNISH CORPORATION OF DETROIT, MICHIGAN, A CORPORATION OF MICHIGAN

PROCESS FOR SIMULATING NATURAL PATTERNS

Original application filed January 24, 1927, Serial No. 163,200. Renewed March 16, 1928. Original No. 1,682,067, dated August 28, 1928. Application for reissue filed April 21, 1930. Serial No. 446,113.

This invention is concerned with processes for refinishing the surfaces of materials in imitation of the natural appearance of other dissimilar materials and has for one of its objects the provision of a novel process for the simulation of a marble appearance on the surfaces of materials other than marble.

More generally, an object is to provide a novel and effective process for the simulation of natural subjects, such as marble, onyx, stone, wood and the like on the surfaces of materials dissimilar to those to be simulated.

More specifically my invention has for its object the provision of a process for simulating, in natural colors, a marble appearance on surfaces of materials other than marble.

Other objects of my invention will be hereinafter set forth in the following description of a preferred manner of fulfilling the steps of my process. The essential characteristics are summarized in the claims.

Figure 1:
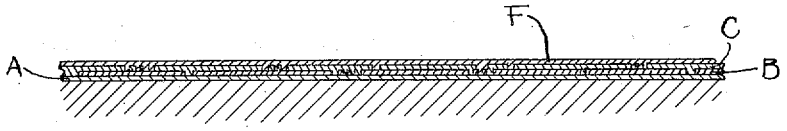
Figure 2:
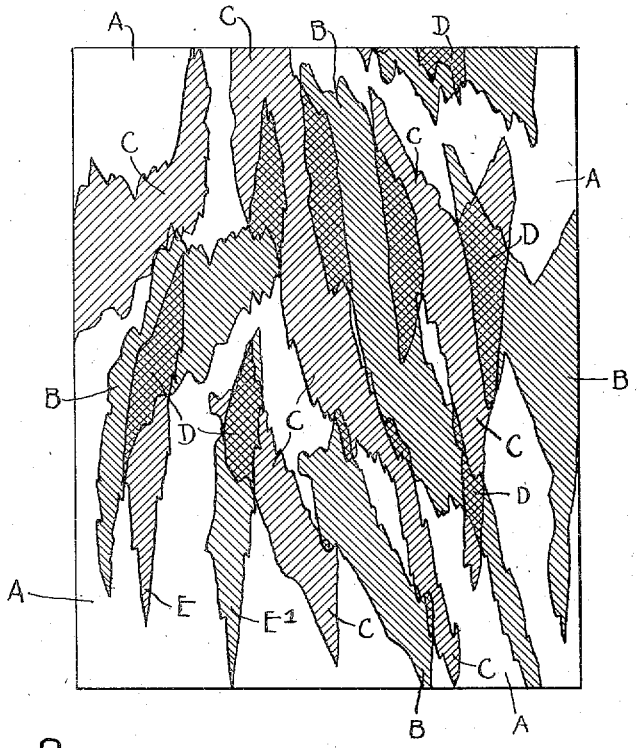

In the drawings, in Fig. 1, I show a cross-section of a piece of material, the surface of which has been treated to resemble the surface of a marble slab after the manner of my process; and Fig. 2 is a diagrammatic graphic representation of the application of several coatings of pigments to a surface to impart to the surface a marble appearance.

My invention contemplates the use of the photographic method of obtaining a metallic etching through a carbon resist and thereafter the etched plate or roll, as the case may be, has applied thereto pigments of different colors to simulate the natural colors of the surface to be imitated. These colors are successively applied to the etched plate or roll and partake therefrom, the pattern in natural contour or outline. This may be accomplished by the use of a transfer roll and the transfers applied to the surface being treated in a certain color order whereby the applied coatings when brought into superimposed contrast simulate the natural surface.

I first obtain a photographic reproduction of the surface to be simulated on either the usual photographic plate or film and from the plate or film I produce a carbon resist, preferably using a screen, and the carbon resist thus obtained is used in a well known manner to produce, for example, a zinc etching or electrotype prepared therefrom and having the characteristics of the well known half-tone plate or a photogravure plate or roll. I prefer to use the latter. If it is desired to use a photogravure plate or roll, one step in the photogravure process may be omitted, namely, the making of a positive film or plate from the photographic plate or film. This produces a photogravure roll or plate which is in reality the reverse of the usual photogravure roll or plate. When the plate is thus properly etched, it is then ready for use.

A subject or material, the surface effects of which have been found to be simulated by my process with exceptionally good results, is marble. The following detailed description of the process will therefore be confined to this material.

I first treat the surface which is to be marbleized with a ground color A simulating in shade as nearly as possible, the natural shades or tones to be found in the grain or cleavage marks of the natural marble which is to be imitated. This is, of course, a comparatively light color. I then apply to the plate or roll a pigment or ink resembling in turn as nearly as possible another color to be found in the original marble slab in the grain or cleavage marks thereof. This color must be darker than the ground. After using a doctor blade to remove the surplus pigment and thereby leaving pigment deposited only in the etched interstices thereof, I remove the pattern thus outlined by the plate with a transfer roll and apply this pattern designated by the reference character B in the drawings, over the first ground coat previously applied to material to be treated by rolling the transfer roll thereover.

I then apply, after the coating which has been applied in the form of a transfer and has had sufficient time to dry, to the roll or plate, a pigment of still darker color, namely that resembling in tone the general or dominating color tone of the marble slab to be simulated and after using the doctor blade to remove the surplus pigment, I transfer a second pattern in this different color from the plate to the surface being treated, but apply this second pattern designated as C, and which in outline is the same as the first pattern B previously applied, to the surface but out of registration with the contour of the first pattern B. The second application produces an unusual result, in that portions of the ground color and the second color will show through the last applied color at the grain or cleavage veins of the pattern and where the various colors are superimposed there is a variation in tonal effect simulating to a striking degree the varying but natural colors of the original marble slab.

Referring again to Fig. 2 it will be noted that when the two transfers overlay as at D the tone is deepened but this depth of tone will vary in accordance with the variation in the tones of the respective transfers, each of which may vary throughout its surface; and also there will be variations from the initial pigment color of the respective transfers for example at E and E′ in accordance with the degree of showing of the color of the ground coating A through the transfers. The graphic representation shown in Fig. 2 however, is considerably exaggerated in that only small areas of ground color will be unobscured in the actual reproductions. A protective transparent coating F of varnish or lacquer may be applied to impart to the treated surface the glossy appearance of polished marble.

This process, as will be readily understood, can be used for the application of more than two colors which will show at places on the surface unblended, while at other places where the pattern contours completely superimpose the composite color will vary in tonal depth. This result can be obtained, as above suggested, by the use of a photogravure, half tone, electrotype or any other printing surface derived through the use of suitable processes of producing printing surfaces by photographic methods.

I claim:

1. A process for decorating surfaces in simulation of natural subjects, having a grain or cleavage vein pattern, which includes the use of an etched plate or roll made from a photographic resist, by first treating the surface to be decorated with an underlying or ground coating of pigment, applying pigment to the etched plate or roll of a color simulating one of the natural pattern colors of the subject to be reproduced, transferring the pigment from the plate or roll to the surface to be finished, drying said transferred pattern, applying to the etched plate or roll a second pigment coating and removing said coating therefrom by a resilient roll, the second transferred pattern being over the previously transferred pattern but out of register therewith to such an extent that the duplication of pattern cannot be noticed on casual observation of the finished product.

2. A process for decorating surfaces in simulation of natural subjects, which includes the use of a printing plate or roll made from a photographic reproduction of the subject to be imitated, by first treating the surface to be decorated with a ground color, applying pigment to the plate or roll of a color simulating one of the natural pattern colors of the subject to be reproduced, transferring the pigment from the plate or roll to the surface to be finished, drying said transferred pattern, applying to the plate or roll a second pigment coating and transferring said coating therefrom to the surface to be finished, the second transferred pattern being superimposed over the previously transferred pattern but out of register therewith to such an extent that the duplication of pattern cannot be noticed on casual observation of the finished product.

3. A process for simulating natural patterns on the surfaces of suitable materials, comprising, etching a plate or roll by using a negative plate or film obtained by photographing a selected original pattern, forming a positive carbon resist from the photographic negative, then using the carbon resist thus formed to form an intaglio plate or roll whereby the plate or roll thus formed may be utilizable to form pigment transfers of more than one color to be applicable in superposed application relation.

4. A process of simulating a natural grain appearance on a hard surface, comprising, using an etched printing surface, prepared from a carbon resist having represented thereon the surface to be simulated, by applying pigment to the etched surface, removing the pigment from the etched surface by the use of a resilient member, transferring the reproduced pattern on the resilient member to the surface to be finished, drying said transferred pattern, applying a different colored pigment to the etched pattern, removing the pigment from the etched pattern by the use of a resilient member, and superimposing this pattern in a different colored pigment over the previously transferred pattern in such degree of non-registration therewith as will render the duplication of design unnoticeable, whereby a color and tone contrast is effected between the two transfers on the surface to be decorated.

5. A process of simulating natural grain subjects on a hard surface, comprising, using an etched printing surface prepared from a positive carbon resist of the selected subject to be simulated by applying pigment to the etched surface, removing the pigment from the etched surface by the use of a resilient roll, applying a light shade ground coat to the surface to be finished, transferring the reproduced pattern on the resilient roll to the light shade surface, applying a different colored pigment from the etched pattern by the use of a resilient roll, and superimposing this pattern of the different colored pigment over the previously transferred pattern.

6. A process of simulating natural subjects on a hard surface, comprising, using an etched printing surface prepared from a positive carbon resist of the selected subject to be simulated by using the etched plate or roll thus formed to make pigment transfers of more than one color and separately applying the transfers to the surface to be finished with the transfers of varying colors out of register.

7. A process of producing a surface appearance simulating grain subjects on a hard surface, comprising using an etched printing surface prepared from a positive carbon resist of the selected subject to be simulated to make transfers of different colors, applying a light shade ground coat to the surface to be finished, then applying a transfer taken from the etched surface of said plate or roll of a different tone than the ground coat.

8. A process of producing a surface appearance simulating grain subjects on a hard surface, comprising, applying a light shade ground coat to the surface to be finished, using an etched printing surface prepared from a positive carbon resist of the selected subject to be simulated to make a negative transfer of one of the color effects of the subject, and then applying a second transfer of another of the color effects of the selected subject and in the design thereof over the first transfer.

9. A process of simulating natural grain subjects on a hard surface, comprising using an etched printing surface prepared from a positive carbon resist of the selected subject to be simulated to make pigment transfers of more than one color, coating the surface to be grained with a light ground color, and applying successive transfers to the light ground surface with the transfers of varying colors out of register.

10. A process for simulating a natural grain pattern appearance on a hard surface, comprising, using an etched printing surface prepared from a photographically treated carbon resist of the grain pattern surface to be simulated, by using the same etched plate or roll to make transfers of differrent colors, applying a ground coat to the surface to be finished, then applying a transfer taken from the etched surface of said plate or roll of a darker tone than the ground coat and then applying a second transfer of a still darker tone.

11. A process for simulating a natural grain pattern appearance on a hard surface, comprising, using a printing surface prepared photographically to carry the natural grain pattern of the surface to be simulated, by using the printing surface to make transfers of different colors, applying a ground coat to the surface to be finished, then applying a pigment transfer taken from the printing surface of a darker tone than the ground coat and then applying a second transfer from the same surface of a still darker tone.

12. A process of simulating the appearance of natural subjects on a hard surface, comprising, using an etched printing surface prepared from a positive carbon resist of the subject to be simulated by using the etched plate or roll thus formed to make pigment transfers of more than one color and applying the transfers to the surface to be finished with the transfers of varying colors out of register, each successive transfer being darker than the previously applied transfer.

13. A process of simulating the grain appearance of a natural subject on a hard surface, comprising, using an etched printing surface prepared from a carbon resist of the surface to be simulated, by applying a ground coat to the surface to be finished, then using the same etched plate or roll to make transfers of different colors, each successive transfer being made by using a pigment of a darker color than any of the preceding applied pigments.

14. A process of reproducing the grain appearance of a natural subject on a hard surface, comprising, using a printing surface carrying a design of the surface to be simulated, by applying a ground coat to the surface to be finished, then using the same printing surface to make successive non-registering transfers of different colors, each successive transfer being made by using a pigment of a darker color than any of the preceding applied pigments.

15. A process for simulating surfaces on the surfaces of materials other than the subject to be simulated, which includes the steps of producing an etched printing surface by using a photographic negative of the surface of the subject to form a positive carbon resist and etching a negative printing plate through the positive carbon resist whereby a printing plate or roll is produced which will print in reverse to the usual plate or roll, and whereby the veins or cleavage line formations of the surface of the subject are indicated by pigment or ink omission during the act of transfer from the printing surface to the surface being finished.

16. The process of reproducing a marble appearance on a hard surface, comprising, using a printing surface derived through the photographic method of printing surface reproduction which printing surface is negative and used by the application of pigment thereto, then removing the pigment from said printing surface by the use of a resilient roll, transferring the reproduced pattern on the resilient roll to the surface to be finished, applying a different colored pigment from the printing pattern by the use of a resilient roll, superposing this pattern of a different colored pigment over the previously transferred pattern, whereby marbleized contrast is effected on the surface to be decorated.

17. The process of simulating the appearance of natural marble on a hard surface, comprising, using a printing surface derived through the photographic method of reproducing surfaces, the printing surface being negative and used by applying pigments thereto to form pigment transfers of more than one color and separately applying the transfers to the surface to be finished with the transfers of varying colors out of register.

18. The process of simulating the appearance of natural grain subjects on a hard surface, comprising, using a printing surface for one grain color derived through the photographic method of reproducing surfaces, the printing surface being negative and used by applying pigment thereto to form pigment transfers of such color and separately applying another grain transfer in a different color but in substantially the same design to the surface to be finished with the transfers of the different colors out of register.

19. A process for simulating surfaces on the surfaces of suitable materials other than the natural surface to be simulated, which includes the step of producing a printing surface derived by the use of the photographic method of printing surface reproduction whereby a negative printing surface is obtained which will print in reverse to the usual plate or roll and thereby define the veins or cleavage lines of the surface to be simulated by pigment or ink omission when said printing surface is used.

20. A process of marbleizing surfaces which includes the use of an etched plate or roll made from a photographic resist, by first treating the surface to be decorated with an underlying or ground coating of pigment, applying the pigment to the etched plate or roll of a color simulating one of the natural grain colors of the marble, transferring the pigment from the plate or roll to the surface to be finished, drying said transferred pattern, applying to the etched plate or roll a second pigment coating and removing said coating therefrom by a resilient roll and thereafter superimposing the transfer pattern over the previously transferred pattern but out of register therewith.

21. The process of reproducing a marble appearance on a hard surface, comprising using a printing surface derived through the photographic method of reproducing surfaces, the printing surface being negative and used by applying pigments thereto to form pigment transfers of more than one color and separately applying the transfers to the surface to be finished with the transfers of varying colors out of register.

In testimony whereof, I hereunto affix my signature.

LLOYD V. CASTO.